(12) United States Patent
Gluck et al.

(10) Patent No.: US 6,336,325 B1
(45) Date of Patent: Jan. 8, 2002

(54) HYDROSTATIC LOOP DUMP VALVE FOR REDUCING INPUT TORQUE REQUIRED BY HYDROSTATIC UNIT

(75) Inventors: Steven H. Gluck, Cambridge; David K. Wohlsdorf, Ames, both of IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/456,050

(22) Filed: Dec. 7, 1999

(51) Int. Cl.$^7$ ................................................ F16D 31/02
(52) U.S. Cl. ............................................ 60/468; 60/494
(58) Field of Search .................... 60/456, 489, 468, 60/494

(56) References Cited

U.S. PATENT DOCUMENTS

| | | | |
|---|---|---|---|
| 3,635,023 A | * 1/1972 | Wayman et al. | 60/436 |
| 4,373,869 A | 2/1983 | Martin et al. | 60/329 |
| 5,048,295 A | 9/1991 | Hoscheler | 60/461 |
| 5,325,670 A | 7/1994 | Iino | 60/468 |

FOREIGN PATENT DOCUMENTS

| | | | |
|---|---|---|---|
| GB | 2079495 A | * | 1/1982 |
| JP | 53125563 A | * | 11/1978 |

* cited by examiner

Primary Examiner—Edward K. Look
Assistant Examiner—Thomas E. Lazo
(74) Attorney, Agent, or Firm—Zarley, McKee, Thomte, Voorhees & Sease, P.L.C.

(57) ABSTRACT

A hydrostatic loop dump valve for reducing the starting torque required for a hydrostatic unit includes a normally biased open dump valve connecting one or more of the system pressure lines to the reservoir. The dump valve(s) will automatically open and oil will drain out by gravity when the engine is not running. When the engine turns the hydrostatic unit at sufficient speeds to generate significant charge pressure, the dump valves will close and the unit will operate as normal. Thus, the input torque required to start the engine and the hydrostatic unit is minimized without damaging the hydrostatic unit.

12 Claims, 3 Drawing Sheets

HYDROSTATIC LOOP DUMP VALVE FOR REDUCING INPUT TORQUE REQUIRED BY HYDROSTATIC UNIT

BACKGROUND OF THE INVENTION

The present invention relates to the field of hydraulics. More particularly, this invention relates to a hydrostatic loop dump valve for reducing the input torque required by a hydrostatic unit, especially during cold oil starting.

It is well known to utilize closed circuit or closed loop hydrostatic transmissions for propulsion of tractors and other vehicles. Conventionally, a variable hydrostatic transmission or unit is directly driven by the engine of the tractor. In cold weather engine starting conditions, the torque required to turn the hydrostatic unit, especially if it is in stroke, is much greater than under warmer conditions. The additional torque load from the hydrostatic unit can overload the engine starting system, making cold weather starting difficult or impossible.

If the hydrostatic variable unit is set at zero displacement (neutral), starting torque will be low. However, the vehicle original equipment manufacturer cannot guarantee that the neutral condition can be achieved before starting the engine. A cost effective method is needed to reduce the hydrostatic torque during starting, especially under cold weather conditions.

Therefore, a primary objective of the present invention is the provision of a hydrostatic loop dump valve for reducing the hydrostatic torque during starting.

Another objective of the present invention is the provision of a hydrostatic unit with one or more loop dump valves that reduce the hydrostatic unit input torque under cold oil conditions, even when the unit is not started in the neutral position.

Another objective of the present invention is the provision of a hydrostatic loop dump valve that automatically closes when there is a build up of charge pressure in either side of the loop so that the hydrostatic unit will not be damaged by running at higher speeds without oil.

Another objective of the present invention is the provision of a hydrostatic loop dump valve which automatically drains the loop when the engine is shut off.

Another objective of the present invention is the provision of a hydrostatic loop dump valve and hydrostatic transmission that is relatively inexpensive to manufacture, simple, and durable and reliable in use.

These and other objectives will be apparent from the drawings as well as from the description and claims which follow.

SUMMARY OF THE INVENTION

The present invention relates to the field of hydraulics. More particularly, this invention relates to a hydrostatic loop dump valve for reducing the input torque required by a hydrostatic unit during cold oil starting.

The hydrostatic loop dump valve of the present invention includes a normally biased open dump valve connecting one or more of the system pressure lines to the reservoir. The dump valve(s) will open and drain oil from the loop by gravity when the engine is not running. When the engine has started and turns the hydrostatic unit at sufficient speeds to generate significant charge pressure, the dump valves close and the unit operates normally. Thus, the initial input torque required to start the engine and the hydrostatic unit is minimized without damaging the hydrostatic unit or interfering with its normal operation after startup.

In one embodiment, a simple dump valve is provided for each side of the loop. The dump valve includes a check ball normally spring biased out of selective engagement with a seat and operatively connected to the sump or case drain. These dump valves are placed at the lowest portion of the loop so that the fluid drains out of the loop when the check ball is unseated. In another similar embodiment, the dump valve is a velocity fuse.

In another embodiment of this invention, a novel loop flushing shuttle valve and dump valve combination is utilized to insure that the dump valve will operate to dump fluid from the system pressure lines to the reservoir, regardless of whether the hydrostatic unit is in neutral, forward or reverse.

DETAILED DESCRIPTION OF THE PREFERRED EMBODIMENT(S)

Figure 1:
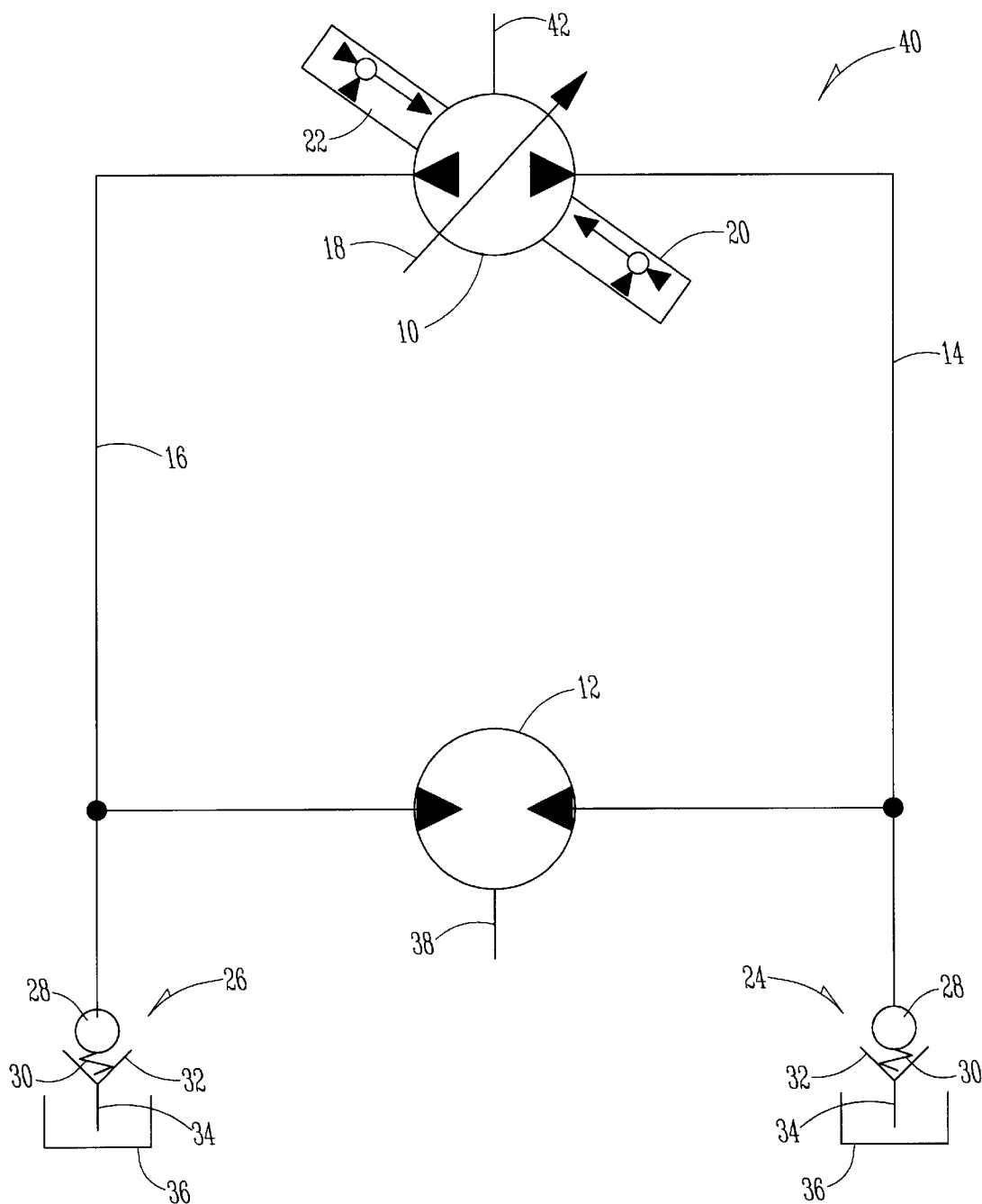
FIG. 1 is a schematic diagram of a variable hydrostatic unit equipped with a dump valve according to a first embodiment of the invention.

Like structures are referred to with like reference numerals in the figures. FIG. 1 discloses one embodiment of the present invention. A variable displacement hydraulic pump 10 is connected in a closed circuit to a hydraulic motor 12 by a pair of system or working pressure lines 14, 16. Preferably the pump 10 is a variable displacement pump having a fluid displacement varying element 18 whose position is controlled by opposing servos 20, 22. The hydraulic motor 12 can be a fixed displacement motor (as shown) or a variable displacement motor.

Dump valves 24, 26 is connected to the first and second system pressure lines 14, 16 respectively. Each of the dump valves 24, 26 includes a check ball 28 that is biased by a spring 30 into a position where it does not engage a seat 32 at the entrance of a line 34 connected to the case drain or reservoir 36. Preferably the dump valves 24, 26 are physically located in the lowest portion of the closed loop so as to fully drain it. Preferably the spring 30 is of the coil compression type.

In operation, when the vehicle engine is off, no charge pressure is developed. The dump valves 24, 26 are urged or biased open by the springs 30. This allows oil to drain out of the loop and little, if any, torque is required to turn the pump shaft 42. As the engine starts, charge pressure will build up in the pressure lines 14, 16 and will eventually overcome the force of the springs 30 to close the dump valves 24, 26. Thus, the variable hydrostatic unit 40 can operate at low speeds for a short time during engine starting without damage and without requiring a significant amount of input torque. However, as the hydrostatic unit 40 warms up and higher speeds are developed, charge pressure will be generated and the dump valves 24, 26 will close to insure adequate charging of the hydrostatic loop. When the engine is shut off, the dump valves 24, 26 will automatically open again to drain the pressure lines of the loop. The oil drains out by gravity before the engine starting procedure begins.

During the engine starting procedure, the dump valves 24, 26 will open before engine starter cranking. Oil will be pumped out of the loop during the initial stage of engine starting. Oil will be reintroduced into the hydrostatic loop after the engine has started.

Figure 1A:
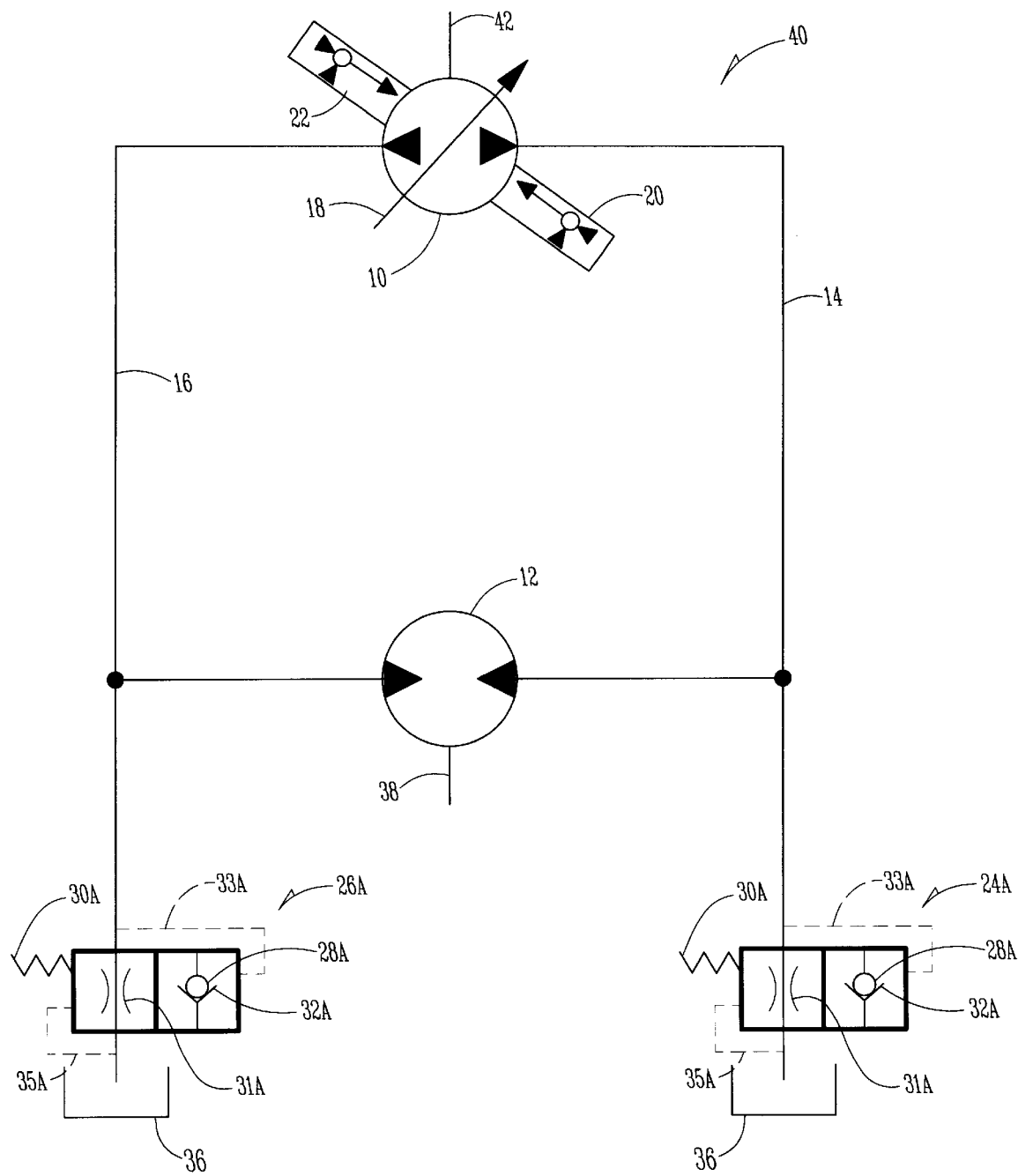
FIG. 1A is a schematic diagram similar to FIG. 1 but shows a dump valve that comprises a velocity fuse rather than a spring-ball check valve.

In FIG. 1A, an alternative embodiment of the dump valves is shown. In that embodiment, a velocity fuse valve 24A, 26A replaces the spring-ball check type dump valves 24, 26. Each velocity fuse valve 24A, 26A is a two-position, two-way valve biased by a spring 30A to an open position. Each valve 24A, 26A is pilot-operated by pilot lines 33A, 35A as shown. An orifice 31A is operatively associated with the open position of the valve 24A, 26A and a check ball 28A and seat 32A are incorporated into the closed position of the valve 24A, 26A.

In operation, the velocity fuses 24A, 26A are open before engine starter cranking. Oil will be pumped out of the loop through the orifice 31A during the initial stage of engine starting. Once significant flow is attained, the orifice 31A creates a pressure drop that manifests itself as a pressure differential between pilot lines 33A, 35A. The differential pressure eventually overcomes the biasing force of the spring 30A and forces the valves 24A, 26A into the right hand or closed position in FIG. 1A.

Figure 2:
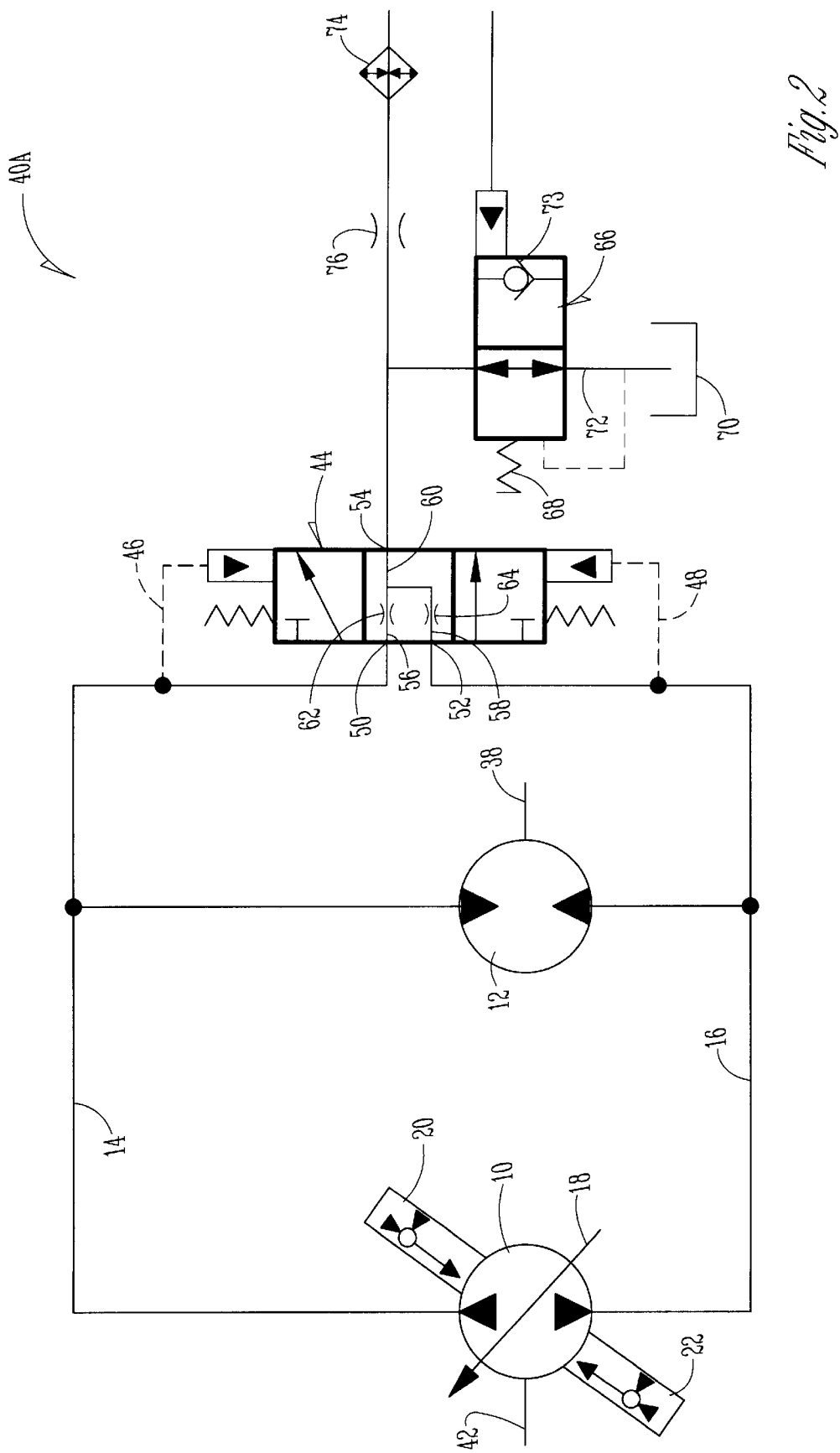
FIG. 2 is a schematic diagram of a variable hydrostatic unit equipped with a dump valve according to another embodiment of this invention.

Another embodiment of this invention is shown in FIG. 2. A spring centered, three position, three port loop flushing shuttle valve 44 is connected to the system pressure lines 14, 16 in parallel with the motor 12. The shuttle valve 44 is pilot pressure operated by a pair of pilot lines 46, 48 connected to system pressure lines 14, 16 respectively. The shuttle valve 44 has first and second inlet ports 50, 52 connected to system pressure lines 14, 16 respectively. Furthermore, the shuttle valve 44 has an outlet port 54.

In a first end position of the shuttle valve 44, the second system pressure line 16 is connected to the outlet port 54 through the second inlet port 52. In the second end position of the shuttle valve 44, the first system pressure line 14 is fluidly connected to the outlet port 54 through the first inlet port 50. The valve 44 has an equilibrium or intermediate position between the two opposite end positions. In the intermediate position, internal passageways 56, 58 join to form internal passageway 60 and connect both the system pressure lines 14, 16 to the outlet port 54 through their respective inlet ports 50, 52. Preferably, orifices 62, 64 are respectively included in the passageways 56, 58. The orifices are large enough to result in minimal pressure drop during low flow starting conditions, but small enough to generate the desired back pressure to maintain loop charge pressure when the engine is running.

A dump valve 66 is located downstream of the loop flushing shuttle valve 44. The dump valve 66 is a two position two port pilot operated valve that is biased by a spring 68 into an open position. The pilot signal comes from the charge circuit. In the open position, the dump valve 66 dumps oil flowing from the outlet port 54 of the shuttle valve 44 into the reservoir 70 through a drain line 72. When the pilot signal applied to the right-hand side of the dump valve 66 is sufficient in pressure to overcome the biasing force of the spring 68, the dump valve 66 moves to the left or into the right position. In this position, the flow to the reservoir or case drain 70 is blocked by a check valve 73 in the dump valve 66 and oil flowing from the outlet port 54 of the shuttle valve 44 flows through a cooling circuit 74 (indicated by the hydraulic symbol for a heat exchanger) through a fixed orifice 76 instead.

In operation, the dump valve 66 and circuit shown in FIG. 2 drains oil to the reservoir 70 when there is no charge pressure. The intermediate position of the shuttle valve 44 is configured to connect both sides of the loop 14, 16 to the dump valve 66. The dump valve is normally opened to the reservoir 70, and is closed by pilot pressure from the charged circuit. During engine starting, oil will be pumped out of the loop until sufficient charge pressure is built up to overcome the bias of the spring 68, which then closes the dump valve 66. In this embodiment, the design of the loop flushing valve 44 is also believed to be novel because oil can flow through the valve 44 when the hydrostatic unit 40A is in neutral (when there is no pressure differential between the two sides of the loop). Conventional loop flushing valves block the flushing flow when the unit is in neutral. However, this invention allows loop oil to pass through the shuttle valve 44 even when it is in the centered, neutral position.

It can be seen that the present invention at least accomplishes its stated objectives.

What is claimed is:

1. A hydrostatic loop dump valve for a hydrostatic transmission including a hydraulic pump, a hydraulic motor fluidly connected to the hydraulic pump in a closed loop circuit by first and second system pressure lines; the loop dump valve comprising:

a pair of dump valves each fluidly connected respectively to the first and second system pressure lines;

the dump valves being normally spring biased to an open position whereby fluid dumps through the dump valves during starting of the transmission;

the dump valves being automatically closed once pressure in the respective first and second system pressure lines exceeds the spring bias; and the dump valves being velocity fuse valves.

2. A hydrostatic loop dump valve for a hydrostatic transmission including a hydraulic pump, a hydraulic motor fluidly connected to the hydraulic pump in a closed loop circuit by first and second system pressure lines; the loop dump valve comprising:

a pair of dump valves each fluidly connected respectively to the first and second system pressure lines;

the dump valves being normally spring biased to an open position whereby fluid dumps through the dump valves during starting of the transmission;

the dump valves being automatically closed once pressure in the respective first and second system pressure lines exceeds the spring bias;

the dump valves being velocity fuse valves; and each of the velocity fuse valves being a two-position two-way differential pilot pressure operated valve that is biased by a spring into an open position having an orifice operatively associated therewith that is fluidly connected to one of the respective first and second system pressure lines.

3. In combination, a loop dump valve circuit and hydrostatic transmission comprising:

a hydraulic pump;

a hydraulic motor fluidly connected to the hydraulic pump in a closed loop circuit by first and second system pressure lines;

the loop dump circuit comprising:

a spring centered pilot pressure operated loop flushing shuttle valve connected to the first and second system pressure lines in parallel with the motor, the loop flushing shuttle valve having an outlet port and first and second inlet ports; and a dump valve comprising a two position two port valve located downstream from the outlet port of the shuttle valve, the dump valve normally being biased into a first position wherein fluid flowing from the shuttle valve is automatically dumped in the absence of a pilot signal of sufficient pressure from a charging circuit to overcome the bias, and when the pilot signal is of sufficient pressure to overcome the bias the dump valve is pressure piloted into a second position wherein fluid flowing from the shuttle valve is blocked from flowing through the dump valve.

4. The combination of claim 3 wherein the loop flushing shuttle valve is a three position three port valve having a first end position wherein the second system pressure line is connected to the outlet port through the second inlet port, a second end position wherein the first system pressure line is connected to the outlet port through the first inlet port, and an intermediate position wherein first and second system pressure lines are connected to the outlet port through the first and second inlet ports respectively.

5. The combination of claim 4 wherein the dump valve is biased into the first position by a coil compression spring.

6. The combination of claim 4 wherein the shuttle valve in its intermediate position includes first and second internal passageways for connecting the first and second inlet ports respectively with the outlet port, the first and second internal passageways both including orifices therein.

7. The combination of claim 3 wherein the outlet port of the shuttle valve is connected to a cooling circuit through a line having an orifice therein located downstream of the dump valve.

8. The combination of claim 3 wherein the pump is a variable displacement pump.

9. The combination of claim 8 wherein the variable displacement pump is servo-controlled.

10. The combination of claim 3 wherein the motor is a fixed displacement motor.

11. The combination of claim 3 wherein the motor is a variable displacement motor.

12. The combination of claim 3 wherein the second position of the dump valve includes a check valve therein.

* * * * *